United States Patent
Im et al.

(10) Patent No.: US 10,783,648 B2
(45) Date of Patent: Sep. 22, 2020

(54) APPARATUS AND METHOD FOR PROCESSING IMAGE

(71) Applicant: Hanwha Techwin Co., Ltd., Seongnam-si (KR)

(72) Inventors: Jin Su Im, Seongnam-si (KR); Ho Woong Lee, Seongnam-si (KR); Min Suk Sung, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 59 days.

(21) Appl. No.: 16/285,431

(22) Filed: Feb. 26, 2019

(65) Prior Publication Data

US 2019/0272647 A1    Sep. 5, 2019

(30) Foreign Application Priority Data

Mar. 5, 2018  (KR) .................. 10-2018-0025912
Jan. 3, 2019  (KR) .................. 10-2019-0000862

(51) Int. Cl.
*G06K 9/00*    (2006.01)
*G06T 7/292*    (2017.01)
(Continued)

(52) U.S. Cl.
CPC ............ *G06T 7/292* (2017.01); *G06K 9/3258* (2013.01); *G06T 7/11* (2017.01); *G06T 7/70* (2017.01);
(Continued)

(58) Field of Classification Search
CPC .. G06T 7/292; G06T 7/11; G06T 7/70; G06K 9/32; G06K 9/3258; H04N 5/232;
(Continued)

(56) References Cited

U.S. PATENT DOCUMENTS 8,477,190 B2 *  7/2013  Giuffrida ................ G06T 17/05
                                                                 348/144
8,564,710 B2 * 10/2013  Nonaka .............. H04N 1/00244
                                                                 348/116
(Continued)

FOREIGN PATENT DOCUMENTS

CN          204315104 U       5/2015
EP          2 481 637 A1      8/2012
(Continued)

OTHER PUBLICATIONS

Communication dated Aug. 6, 2019, issued by the European Patent Office in counterpart European Application No. 19160759.7.

*Primary Examiner* — Mahendra R Patel
(74) *Attorney, Agent, or Firm* — Sughrue Mion, PLLC

(57) ABSTRACT

An image processing apparatus includes a display configured to display at least one screen; a communication interface configured to receive camera information from at least one camera; a processor configured to extract position information, time information, and image information corresponding to one another from the camera information and generate a first screen displaying the position information, a second screen displaying the time information, and a third screen for displaying the image information; and a user interface configured to receive a user input for selecting first position information from the position information or first time information from the time information, wherein the processor is further configured to extract first image information corresponding to the first position information or the first time information from the image information and reproduce the first image information through the third screen.

18 Claims, 14 Drawing Sheets

(51) Int. Cl.
*G06T 7/11* (2017.01)
*G06T 7/70* (2017.01)
*H04N 5/232* (2006.01)
*G06K 9/32* (2006.01)
*H04N 7/18* (2006.01)
*G08B 13/196* (2006.01)
*H04N 21/218* (2011.01)

(52) U.S. Cl.
CPC ... *G08B 13/19682* (2013.01); *H04N 5/23206* (2013.01); *H04N 5/23216* (2013.01); *H04N 5/23299* (2018.08); *H04N 7/181* (2013.01); *H04N 21/21805* (2013.01); *G06T 2207/30232* (2013.01)

(58) Field of Classification Search
CPC ............... H04N 5/23299; H04N 7/181; H04N 21/21805; H04N 5/23216; H04N 5/23206; G08B 13/19608; G08B 13/19643; G08B 13/19682
USPC .......... 382/103; 348/159, 231.3, 333.02, 118
See application file for complete search history.

(56) References Cited

U.S. PATENT DOCUMENTS

| | | | |
|---|---|---|---|
| 9,449,229 B1* | 9/2016 | Laska | G06K 9/00765 |
| 10,402,676 B2* | 9/2019 | Wang | G06T 7/50 |
| 2009/0303329 A1* | 12/2009 | Morisaki | H04N 7/183 348/159 |
| 2012/0194355 A1* | 8/2012 | Thomas | H04N 7/181 340/932.2 |
| 2013/0290116 A1* | 10/2013 | Hepworth | G06F 3/0482 705/14.73 |
| 2015/0356840 A1* | 12/2015 | Wang | G08B 13/19682 382/103 |
| 2016/0014342 A1* | 1/2016 | Kim | G11B 27/105 348/231.3 |
| 2016/0063109 A1* | 3/2016 | Liu | G06F 16/9535 707/706 |
| 2016/0210516 A1* | 7/2016 | Kim | G06K 9/00751 |
| 2016/0225163 A1* | 8/2016 | Alt | G05D 23/00 |
| 2017/0315772 A1* | 11/2017 | Lee | G09G 5/10 |
| 2017/0359536 A1* | 12/2017 | Lee | H04N 5/232 |

FOREIGN PATENT DOCUMENTS

| | | | | |
|---|---|---|---|---|
| EP | 3 217 679 A1 | 9/2017 | | |
| EP | 3 226 105 A1 | 10/2017 | | |
| EP | 3 244 344 A1 | 11/2017 | | |
| EP | 3244344 A1 * | 11/2017 | | H04N 7/181 |
| KR | 10-2009-0132339 A | 12/2009 | | |
| KR | 20090132339 A * | 12/2009 | | |
| KR | 10-1015236 B1 | 2/2011 | | |
| KR | 10-1404153 B1 | 6/2014 | | |
| KR | 101404153 B1 * | 6/2014 | | |
| KR | 10-1686851 B1 | 12/2016 | | |
| KR | 10-1689810 B1 | 12/2016 | | |
| KR | 101686851 B1 * | 12/2016 | | |

* cited by examiner

APPARATUS AND METHOD FOR PROCESSING IMAGE

CROSS-REFERENCE TO THE RELATED APPLICATION

This application claims priority from Korean Patent Application No. 10-2018-0025912, filed on Mar. 5, 2018, and Korean Patent Application No. 10-2019-0000862, filed on Jan. 3, 2019 in the Korean Intellectual Property Office, the disclosures of which are incorporated herein in their entirety by reference.

BACKGROUND

1. Field

One or more embodiments relate to an apparatus and a method for processing an image for object tracking.

2. Description of the Related Art

An image processing apparatus provides a user with an image acquired by a camera. At this time, the image processing apparatus may provide a real-time image or a recorded image to the user.

Meanwhile, the image processing apparatus may not only provide the user with the whole recorded image, but may also provide a part of the recorded image to the user. The part of the recorded image may be a continuous image or a summation of discontinuous images.

A user interface is needed to select and provide the user with the part of the recorded image.

SUMMARY

One or more exemplary embodiments of the inventive concept include an apparatus and a method for processing an image for object tracking.

Various aspects of the inventive concept will be set forth in part in the description which follows and, in part, will be apparent from the description, or may be learned by practice of the presented embodiments.

According to one or more embodiments, there is provided an image processing apparatus which may include: a display configured to display at least one screen; a communication interface configured to receive camera information from at least one camera; a processor configured to extract at least one position information, at least one time information, and at least one image information corresponding to one another from the camera information; and generate a first screen displaying the at least one position information, a second screen displaying the at least one time information, and a third screen for displaying the at least one image information. The image processing apparatus may further include a user interface configured to receive a user input for selecting at least one of first position information from the at least one position information, and receive first time information from the at least one time information, wherein the processor is further configured to extract, from the at least one image information, first image information corresponding to at least one of the first position information and the first time information, and reproduce the first image information through the third screen.

The camera may be a movable camera.

The processor may be further configured to extract at least one object from the at least one image information and generate a fourth screen displaying the at least one object, and the user interface may be further configured to receive a user input for selecting a first object from the at least one object, and the processor may be further configured to extract second image information including the first object from the at least one image information and reproduce the second image information through the third screen.

The processor may be further configured to extract second position information corresponding to the second image information from the at least one position information or second time information corresponding to the second image information from the at least one time information, update the first screen such that the second position information is displayed thereon, and update the second screen such that the second time information is displayed thereon.

The at least one object may be at least one of a license plate number of a vehicle, a face, a voice, and a sound having a predetermined frequency.

According to one or more embodiments, there is provided an image processing apparatus which may include: a database storing camera position information; a display configured to display at least one screen; a communication interface configured to receive first camera information from at least one first camera configured to recognize an object, and receive second camera information from at least one second camera not configured to recognize the object; and; and a processor configured to: extract, from the first camera information, at least one first camera position information, at least one first camera time information, and at least one first camera image information corresponding to one another; extract, from the database, at least one second camera position information indicating a position of the at least one second camera positioned within a predetermined distance from a position of the at least one first camera indicated by the at least one first camera position information; extract, from the second camera information, at least one second camera time information and at least one second camera image information corresponding to the at least one second camera position information; and generate a first screen displaying the at least one first camera position information and the at least one second camera position information, a second screen displaying the at least one first camera time information and the at least one second camera time information, and a third screen for displaying the at least one first camera image information or the at least one second camera image information.

The object may be at least one of a license plate number of a vehicle, a face, a voice, and a sound having a predetermined frequency.

The at least one first camera and the at least one second camera may be stationary cameras.

The at least one first camera position information and the at least one second camera position information may be displayed distinguishably from each other on the first screen.

The at least one first camera time information and the at least one second camera time information may be displayed distinguishably from each other on the second screen.

The processor may be further configured to: extract the object from the at least one first camera image information; determine a moving direction of the object; and extract, from the database, the at least one second camera position information indicating a position of the at least one second camera positioned within the predetermined distance in the moving direction of the object from a position of the at least one first camera indicated by the at least one first camera position information.

The image processing apparatus may further include a user interface configured to receive a user input for selecting an area other than an area of the at least one first camera position information on the first screen, wherein the processor is further configured to extract, from the database, the at least one second camera position information corresponding to the selected area, in response to the user input.

The image processing apparatus may further include a user interface configured to receive a user input for selecting an area other than an area of the at least one first camera time information on the second screen, wherein the processor is further configured to extract, from the database, the at least one second camera position information corresponding to the selected area, in response to the user input.

The image processing apparatus may further include a user interface configured to receive a first user input for selecting the at least one first camera position information or the at least one second camera position information displayed on the first screen, and a second user input for selecting the at least one first camera time information or the at least one second camera time information displayed on the second screen, wherein the processor is further configured to reproduce the at least one first camera image information or the at least one second camera image information through the third screen in response to the first user input, and reproduce the at least one first camera image information or the at least one second camera image information through the third screen in response to the second user input.

According to one or more embodiments, there is provided an image processing method which may include: storing camera position information in a database; receiving first camera information from at least one first camera capable of recognizing an object, and receiving second camera information from at least one second camera not configured to recognize the object, by using a communication interface; extracting, from the first camera information, at least one first camera position information, at least one first camera time information, and at least one first camera image information corresponding to one another, by using a processor; extracting, from the database, at least one second camera position information indicating a position of the at least one second camera positioned within a predetermined distance from a position of the at least one first camera position indicated by the at least one first camera position information, by using the processor; extracting, from the second camera information, at least one second camera time information and at least one second camera image information corresponding to the at least one second camera position information, by using the processor; and generating a first screen displaying position information comprising the at least one first camera position information, a second screen displaying time information comprising the at least one first camera time information, and a third screen for displaying the at least one first camera image information, by using the processor.

The object may be at least one of a license plate number, a face, a voice, and a sound having a predetermined frequency.

The at least one first camera and the at least one second camera may be stationary cameras.

The at least one first camera position information and the at least one second camera position information may be displayed distinguishably from one another on the first screen.

The at least one first camera time information and the at least one second camera time information may be displayed distinguishably from each other on the second screen.

The at least one position information may displayed in a form of a map.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
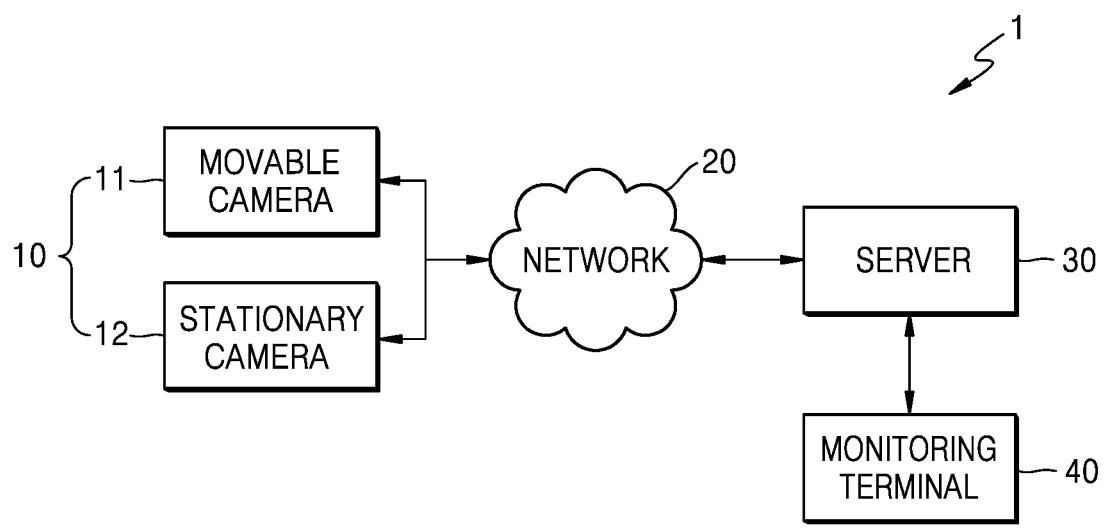
FIG. 1 is a diagram for explaining a security system according to an embodiment.

Reference will now be made in detail to embodiments which are illustrated in the accompanying drawings, wherein like reference numerals refer to like elements throughout. It is to be noted that the embodiments presented herein are all exemplary, and, these embodiments may have different forms and should not be construed as being limited to the descriptions set forth herein. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The embodiments presented herein are not intended to limit the inventive concept to particular modes of practice, and it is to be appreciated that all changes, equivalents, and substitutes that do not depart from the spirit and technical scope of the inventive concept are encompassed in the present disclosure. In the description of the present disclosure, certain detailed explanations of the related art are omitted when it is deemed that they may unnecessarily obscure the essence of the disclosure.

While such terms as "first," "second," etc., may be used to describe various components, such components must not be limited to the above terms. The above terms are used only to distinguish one component from another. An embodiment provided in the following description is not excluded from being associated with one or more features of another example or another embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

In the present disclosure, it is to be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the disclosure may be implemented with any programming or scripting language such as C, C++, Java, assembler language, or the like, with the various algorithms being implemented with any combination of information structures, objects, processes, routines or other programming elements. Functional aspects may be implemented in algorithms that are executed on one or more processors. Furthermore, the present disclosure could employ any number of conventional techniques for electronics configuration, signal processing and/or control, information processing and the like. The words "mechanism", "element", "means", and "configuration" are used broadly and are not limited to mechanical or physical embodiments, but may include software routines in conjunction with processors, etc.

Hereinafter, various embodiments of the inventive concept will be described in detail with reference to the accompanying drawings.

FIG. 1 is a diagram for explaining a security system according to an embodiment.

Referring to FIG. 1, a security system 1 according to an embodiment includes a camera 10, a network 20, a server 30, and a monitoring terminal 40.

The security system 1 provides a configuration in which when information of the camera 10 is transmitted to the server 30 over the network 20, a user monitors the information transmitted to the server 30 by using the monitoring terminal 40.

The camera 10 includes a movable camera 11 and a stationary camera 12.

The movable camera 11 may be carried by a person or installed in a vehicle. A surveillance area of the movable camera 11 may be fixed or may change in accordance with a movement of the movable camera 11.

The movable camera 11 may be driven by a regular power or by a battery. For example, the movable camera 11 installed in the vehicle may be supplied with a regular power from the vehicle, and the movable camera 11 separated from the vehicle may be driven by a battery.

The movable camera 11 may capture images of the surveillance area at all times or may maintain a sleep mode at normal times and switch to an active mode only when an event occurs and then capture images of the surveillance area.

The stationary camera 12 may be installed in a street. An installation area of the stationary camera 12 may not change. At this time, a surveillance area of the stationary camera 12 may be fixed or changed.

The stationary camera 12 may be a pan/tilt/zoom (PTZ) camera. The PTZ camera may be a camera capable of panning and tilting and adjusting the zoom magnification of a lens. A surveillance area of the PTZ camera may be changed according to panning, tilting, and/or zoom magnification control of the PTZ camera.

The stationary camera 12 may be driven by a regular power or a battery.

The stationary camera 12 may photograph the surveillance area at all times or may photograph the surveillance area only when an event occurs.

For example, the PTZ camera may maintain the sleep mode at normal times and may periodically wake up to check whether the event has occurred. The PTZ camera may switch to the active mode when the event occurs, capture an image, and return to the sleep mode again when the event does not occur.

The camera 10 may generate position information and time information based on a Global Positioning System (GPS) signal received through a GPS module (not shown). The GPS module (not shown) may be provided in the camera 10 or separately from the camera 10, but is not limited thereto.

The position information indicates a position of the camera 10. For example, the position information may include GPS coordinate information about the camera 10. The time information indicates a time or a time point.

The camera 10 generates camera information including position information, time information, and image information corresponding to one another. That is, the camera information includes an image captured at a predetermined position at a predetermined time point.

The camera 10 transmits the camera information to the server 30 over the network 20.

The camera 10 may recognize an object. The camera 10 may recognize, for example, a license plate number of a vehicle, a face, a voice, a sound having a predetermined frequency, and the like, but is not limited thereto. The camera 10 capable of recognizing the object may distinguish and generate camera information in which the object is recognized and camera information in which the object is not recognized.

The camera 10 may generate camera information without regard to recognition of the object. In this case, the camera 10 may generate camera information in which the object is recognized and camera information in which the object is not recognized, without any distinction.

The network 20 may include a wired network or a wireless network. The wireless network may be a 2G or 3G cellular communication system, a 3rd Generation Partnership Project (3GPP), a 4G communication system, a Long-Term Evolution (LTE), or a World Interoperability for Microwave Access (WiMAX).

The server 30 may transmit camera information transmitted from the camera 10 over the network 20 to the monitoring terminal 40 and generate commands based on a user input from the monitoring terminal 40 and then transmit the commands to the camera 10 over the network 20.

The monitoring terminal 40 may reproduce and store the camera information transmitted from the server 30. For example, the monitoring terminal 40 displays an image transmitted from the server 30.

The monitoring terminal 40 may receive a user input and transmit the user input to the server 30. The user input may be a predetermined position in a map, a predetermined position at a time bar, or a user input for selecting a predetermined object.

The monitoring terminal 40 may include at least one or more processors. The monitoring terminal 40 may be driven by being included in another hardware device having a microprocessor or a general purpose computer system. The monitoring terminal 40 may be a personal computer or a mobile terminal.

Figure 2:
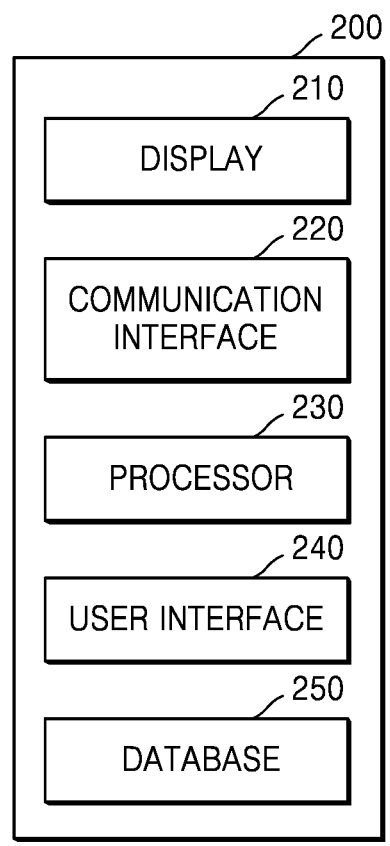
FIG. 2 is a block diagram showing a configuration of an image processing apparatus according to an embodiment.

FIG. 2 is a block diagram showing a configuration of an image processing apparatus according to an embodiment.

Referring to FIG. 2, an image processing apparatus 200 according to an embodiment includes a display 210, a communication interface 220, a processor 230, a user interface 240, and a database 250.

The display 210 displays at least one screen.

The communication interface 220 receives camera information from the camera 10 of FIG. 1. The camera 10 may be the movable camera 11.

The processor 230 extracts position information, time information, and image information corresponding to one another from the camera information, and generates a first screen including a map displaying the position information, a second screen including a time bar displaying the time information, and a third screen for displaying the image information. The processor 230 also extracts, from the image information, first image information corresponding to at least one of first position information and first time information in response to a user input information, and reproduces the first image information through a third screen.

The processor 230 may extract at least one object from the image information and generate a fourth screen displaying the object.

The object may be at least one of a license plate number of a vehicle, a face, a voice, and a sound having a predetermined frequency.

The processor 230 may extract, from the image information, second image information including a first object information in response to a user input for selecting the first object from the object through the fourth screen, and reproduce the second image information through the third screen.

At this time, the processor 230 may extract second position information corresponding to the second image information from the position information and/or extract second time information corresponding to the second image information from the time information, and update the first screen such that the second position information is displayed on the map and/or update the second screen such that the second time information is displayed on the time bar.

Accordingly, the image processing apparatus 200 according to an embodiment may provide the user with the map indicating a position where a selected object is photographed according to a user input through the first screen, the time bar representing a time point at which the selected object is photographed according to a user input through the second screen, and an image obtained by photographing the selected object according to a user input through the third screen and the selected object according to a user input through the fourth screen.

The processor 230 extracts, from the first camera information received from a first camera such as the camera 10, first camera position information, first camera time information, and first camera image information corresponding to one another. The processor 230 also extracts, from the database 250, second camera position information indicating a position of a second camera such as the camera 10 positioned within a predetermined distance from a position of the first camera indicated by the first camera position information. The processor 230 further extracts, from second camera information received from the second camera, second camera time information and second camera image information corresponding to the second camera position information, and generates a first screen including a map displaying the first camera position information and the second camera position information, a second screen including a time bar displaying the first camera time information and the second camera time information, and a third screen for displaying the first camera image information or the second camera image information.

In the descriptions below, the term "first (second, third, or fourth) camera information" refers to information about the first, second, third, or fourth camera, respectively. Also, the term "first (second, third, or fourth) camera position information" refers to information about a position of the first (second, third, or fourth) camera, the term "first (second, third, or fourth) camera time information" refers to information about a time point of the first (second, third, or fourth) camera, and the term "first (second, third, or fourth) camera image information" refers to the image information of the first (second, third, or fourth) camera. Further, the term "at least one position (time or image) information" refers to information about at least one position (time (or time point) or image).

The user interface 240 receives a user input for selecting the first position information from the position information or the first time information from the time information.

The user interface 240 may receive a user input for selecting the first object from the object.

The database 250 stores the position information about the camera 10. The database 250 may store the first camera position information and the second camera position information.

The communication interface 220 receives the first camera information from a first camera configured to recognize the object, and receives the second camera information from a second camera not configured to recognize the object.

The object may be at least one of the license plate number of the vehicle, the face, the voice, and the sound having the predetermined frequency.

The first camera information may include an image captured by the first camera at a predetermined time point at a predetermined position.

The second camera information may include an image captured by the second camera at a predetermined time point at a predetermined position.

The processor 230 extracts the first camera position information, the first camera time information, and the first camera image information corresponding to one another from the first camera information. The processor 230 also extracts, from the database 250, the second camera position information indicating a position of the second camera positioned within a predetermined distance from a position of the first camera indicated by the first camera position information. The processor 230 further extracts, from the second camera information, the second camera time information and the second camera image information corresponding to the second camera position information, and generates a first screen including a map displaying the first camera position information and the second camera position information, a second screen including a time bar displaying first camera time information and the second camera time information, and a third screen for displaying the first camera image information or the second camera image information.

The processor 230 extracts at least one object from the first camera image information, determine a movement direction of the object, and extract, from the database 250, the second camera position information indicating a position of the second camera positioned within a predetermined distance in the movement direction of the object from a position of the first camera indicated by the first camera position information.

Accordingly, the image processing apparatus 200 according to an embodiment provides not only an image of an object photographed by the first camera capable of recognizing the object, but also an image of the object photographed by the second camera incapable of recognizing the object, thereby providing a more reinforced object tracking function.

The processor 230 may extract the second camera position information in response to a user input for selecting an area other than an area in the map where the first camera position information is displayed.

The processor 230 may extract the second camera position information in response to a user input for selecting an area other than an area at the time bar where the e first camera time information is displayed.

Each of the first camera and the second camera are one or more. The first camera and the second camera may be stationary cameras 12.

When there are a plurality of first cameras, for example, each first camera may generate the first camera information including at least one image obtained by photographing an object recognized by the first camera.

When there are a plurality of second cameras, for example, a second camera may generate the second camera information including an image obtained by photographing the object recognized by the first camera, and another second camera may generate the second camera information including an image obtained by not photographing the object recognized by the first camera.

The first camera position information and the second camera position information may be displayed to be distinguished from each other on the map.

The first camera time information and the second camera time information may be displayed to be distinguished from each other on the time bar.

The processor 230 may reproduce the first camera image information in response to a first user input for selecting the first camera position information on the map through the third screen, or reproduce the second camera image information in response to a second user input for selecting the second camera position information on the map through the third screen.

The processor 230 may extract at least one object from the first camera image information, and generate the fourth screen displaying the object.

The processor 230 may extract third camera image information including the first object selected according to a user input through the first screen from the first camera image information, and fourth camera image information including the first object from the second camera image information, and reproduce the third camera image information and the fourth camera image information through the third screen.

Accordingly, the image processing apparatus 200 according to an embodiment may provide the user with the map indicating a position where the selected object is photographed according to a user input through the first screen, the time bar representing a time at which the selected object is photographed according to a user input through the second screen, and an image obtained by photographing the selected object according to a user input through the third screen, and the selected object according to a user input through the fourth screen.

The user interface 240 may receive a user input for selecting an area other than an area of the map where the first camera position information is displayed.

The user interface 240 may receive a user input for selecting an area other than an area of the time bar where the first camera time information is displayed.

The user interface 240 may receive the first user input for selecting the first camera position information displayed on the map or the second user input for selecting the second camera position information displayed on the map.

The user interface 240 may receive a user input for selecting the first object from the at least one object.

The image processing apparatus 200 according to the embodiments may be implemented as one physical device or a plurality of physical devices organically combined with each other. To this end, some of the components included in the image processing apparatus 200 may be implemented or installed as any one physical device, and the other components may be implemented or installed as other physical devices.

Meanwhile, the image processing apparatus 200 may be embedded in the camera 10, the server 30 or the monitoring terminal 40 or may be applied to a device separately from the camera 10, the server 30, or the monitoring terminal 40.

Hereinafter, an operation of the image processing apparatus 200 according to an embodiment will be described in detail with reference to FIGS. 3 to 7.

Figure 3:
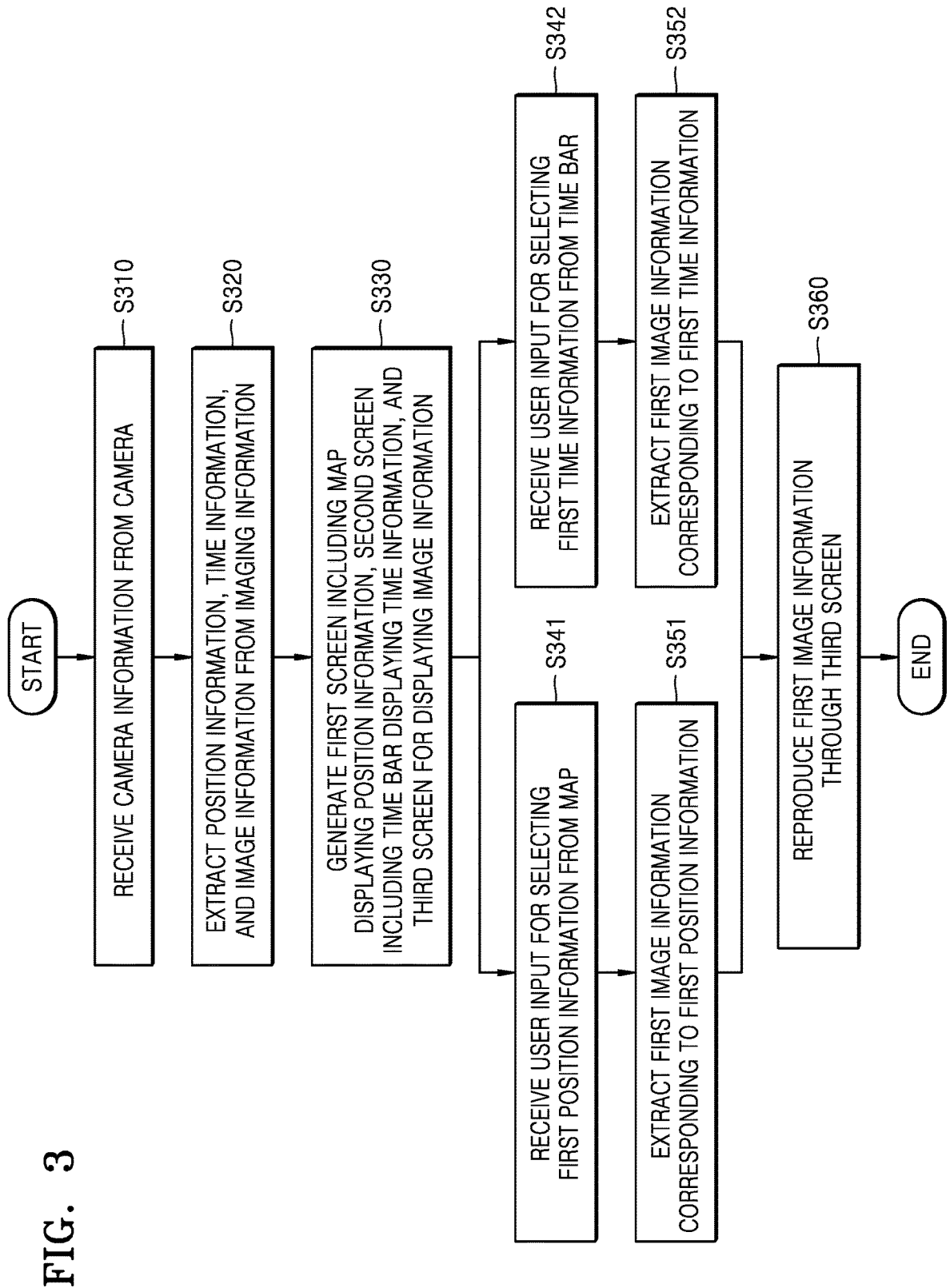
FIG. 3 is a flowchart illustrating an image processing method according to an embodiment.

FIG. 3 is a flowchart illustrating an image processing method according to an embodiment.

Figure 4:
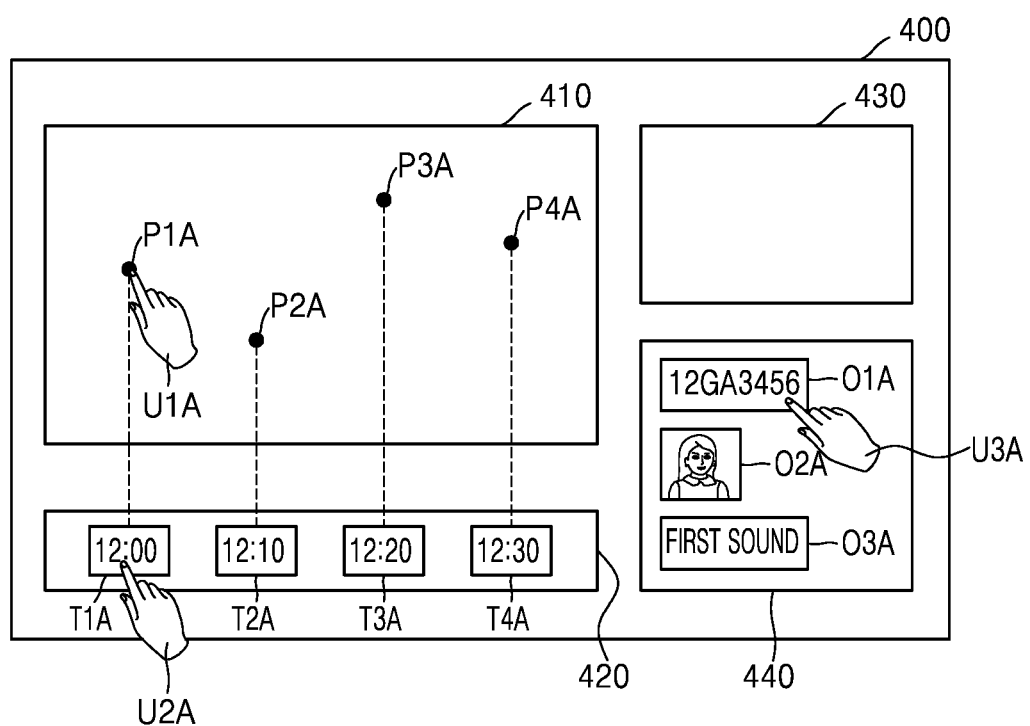
FIG. 4 is a diagram illustrating a screen of an image processing apparatus according to an embodiment.

FIG. 4 is a diagram illustrating a screen of an image processing apparatus, according to an embodiment.

Referring to FIG. 4 along with FIG. 2, the display 210 of the image processing apparatus 200 may display a screen 400 including a first screen 410, a second screen 420, a third screen 430, and a fourth screen 440.

Referring to FIGS. 1 to 4, the communication interface 220 receives camera information from the camera 10 (S310). The camera 10 may be, for example, the movable camera 11 mounted on a vehicle.

The processor 230 extracts, from the camera information, position information, time information, and image information corresponding to one another (S320).

The position information may include, for example, first, second, third and fourth position information P1A, P2A, P3A and P4A. The time information may include, for example, first, second, third and fourth time information T1A, T2A, T3A and T4A. The image information may include, for example, first, second, third and fourth image information.

Here, the first position information P1A, the first time information T1A, and the first image information may correspond to one another, and the second position information P2A, the second time information T2A, and the second image information may correspond to one another, the third position information P3A, the third time information T3A and the third image information may correspond to one another, and the fourth position information P4A, the fourth time information T4A, and the fourth image information may correspond to one another. In other words, the first, second, third and fourth images may be obtained by the camera 10 at the first, second, third and fourth positions P1A, P2A, P3A and P4A at the first, second, third and fourth time points T1A, T2A, T3A and T4A, respectively.

Thereafter, the processor 230 generates the first screen 410 including a map displaying the position information, the second screen 420 including a time bar displaying the time information, and the third screen 430 for displaying the image information (S330).

For example, the processor 230 may generate the first screen 410 including the map displaying the first, second, third and fourth position information P1A, P2A, P3A and P4A, the second screen 420 including the time bar displaying the first, second, third and fourth time information T1A, T2A, T3A and T4A, and the third screen 430 for displaying image information from among the first, second, third and fourth image information, according to a user input.

Then, the user interface 240 receives a user input for selecting first position information from the position information (S341).

For example, the user interface 240 may receive a first user input U1A for selecting the first position P1A from the first, second, third and fourth positions P1A, P2A, P3A and P4A displayed on the first screen 410.

The processor 230 extracts first image information corresponding to the first position information from the image information, according to a user input (S351).

For example, the processor 230 may extract the first image corresponding to the first position P1A from the first, second, third and fourth images, according to the first user input U1A.

Meanwhile, the user interface 240 receives a user input for selecting first time information from the time information (S342).

For example, the user interface 240 may receive a second user input U2A for selecting the first time point T1A from the first, second, third and fourth time points T1A, T2A, T3A and T4A displayed on the second screen 420.

The processor 230 extracts first image information corresponding to the first time information from the image information, according to a user input (S352).

For example, the processor 230 may extract the first image corresponding to the first time point T1A from the first, second, third and fourth images, according to the second user input U2A.

The processor 230 reproduces an extracted image, that is, the first image, through the third screen 430 (S360).

Figure 5:
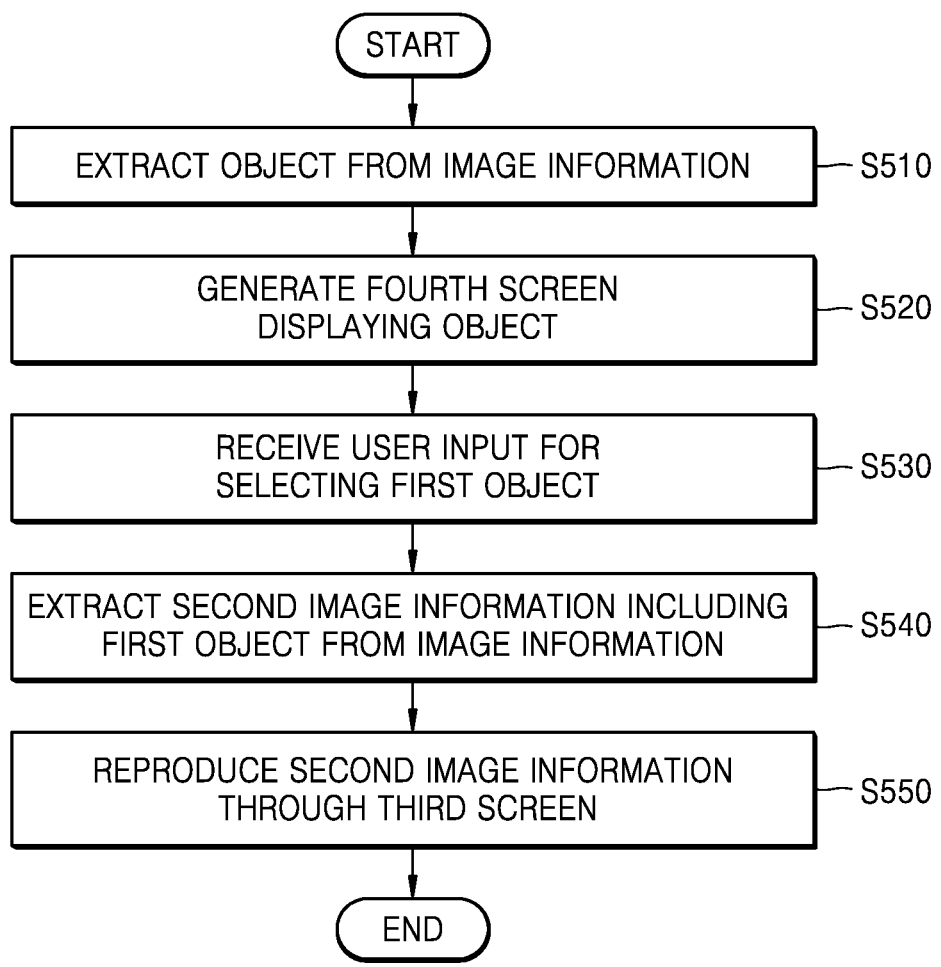
FIG. 5 is a flowchart illustrating an image processing method according to an embodiment.

FIG. 5 is a flowchart illustrating an image processing method according to an embodiment.

Referring to FIGS. 1, 2, 4, and 5, the processor 230 extracts at least one object from at least one image (S510).

For example, the processor 230 extracts first, second and third objects O1A, O2A and O3A from first, second, third and fourth image information. The first object O1A may be a predetermined license plate number of a vehicle. The second object O2A may be a predetermined face. The third object O3A may be a predetermined sound. However, the inventive concept is not limited thereto, and thus, different types of object may be extracted by the processor 230.

Then, the processor 230 generates the fourth screen 440 displaying the extracted object (S520).

For example, the processor 230 may display the first, second, and third objects O1A, O2A and O3A on the fourth screen 440.

Then, the user interface 240 receives a user input for selecting the first object from the extracted object (S530).

For example, the user interface 240 may receive a third user input U3A for selecting the first object O1A from the first, second and third objects O1A, O2A and O3A.

Then, the processor 230 extracts second image information including the first object from the image information (S540).

For example, the processor 230 may extract the first, second and third image information including the first object O1A from the first, second, third and fourth image information.

Then, the processor 230 reproduces the extracted image information through the third screen 430 (S550).

For example, the processor 230 may sequentially reproduce the first, second and third image information including the first object O1A through the third screen 430.

Figure 6A:
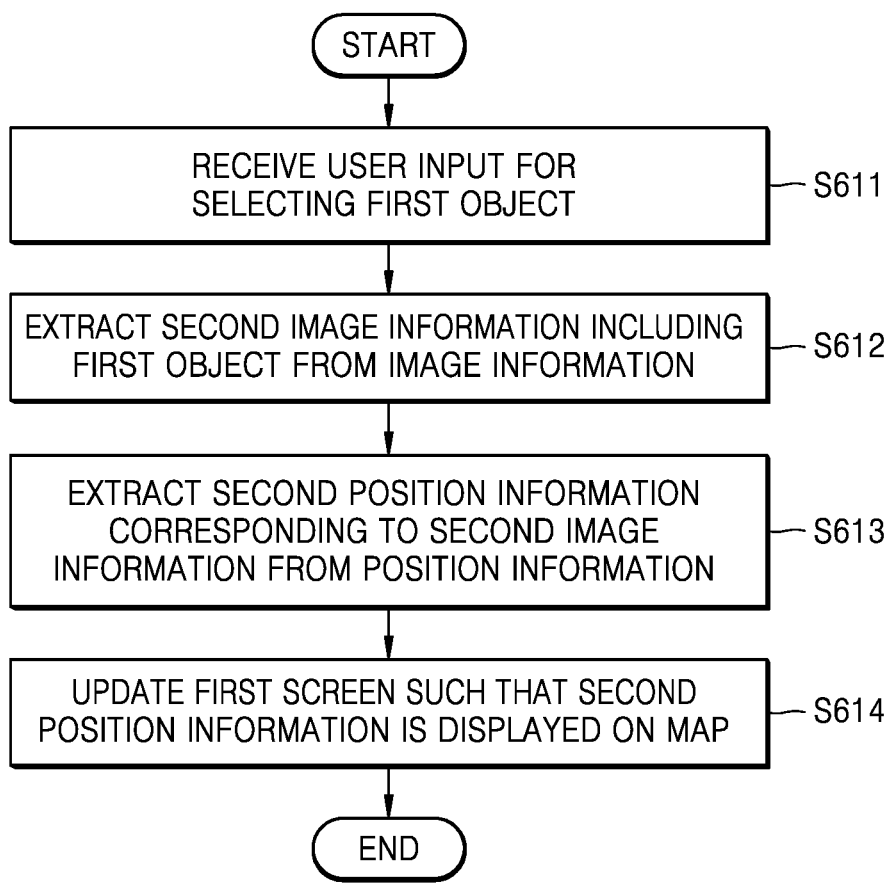
FIGS. 6A and 6B are flowcharts for explaining an image processing method according to an embodiment.
Figure 6B:
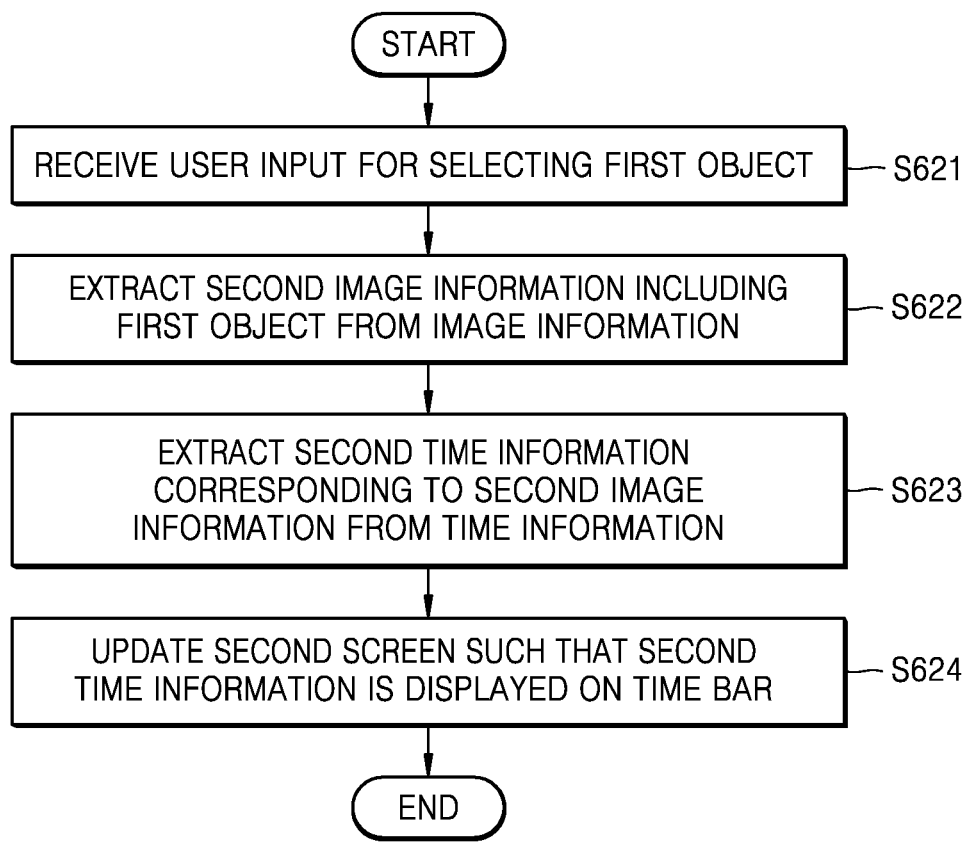

FIGS. 6A and 6B are flowcharts for explaining an image processing method according to an embodiment.

Figure 7:
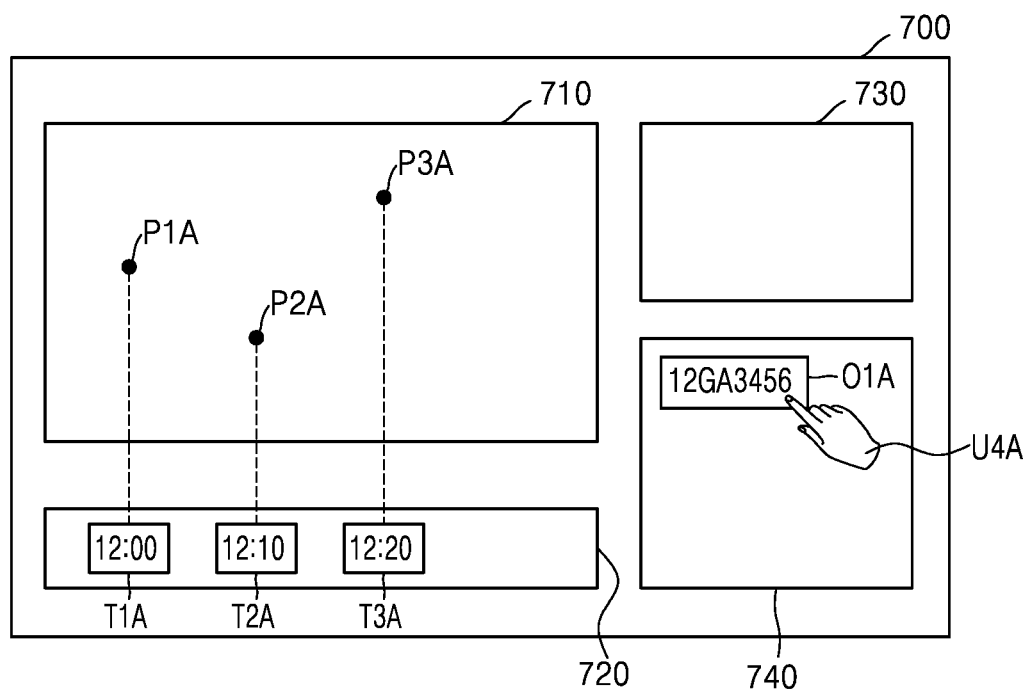
FIG. 7 is a diagram illustrating a screen of an image processing apparatus according to an embodiment.

FIG. 7 is a diagram illustrating a screen of an image processing apparatus, according to an embodiment.

Referring to FIGS. 1, 2, 6A, and 7, when the user interface 240 receives a user input for selecting a first object from at least one object (S611), and the processor 230 extracts second image information including the first object from at least one image information captured by the camera 10 (S612), the processor 230 extracts second position information corresponding to the second image information from at least one position information (S613).

For example, when the user interface 240 receives a fourth user input U4A for selecting the first object O1A and the processor 230 extracts first, second and third image information which include the first object O1A, the processor 230 may extract, from the at least one position information, the first, second and third position information P1A, P2A and P3A corresponding to the first, second and third image information, respectively.

At this time, the processor 230 may update a fourth screen 740 such that the second and third objects O2A and O3A which are not selected are not displayed thereon in response to the fourth user input U4A for selecting the first object O1A.

Thereafter, the processor 230 updates a first screen 710 such that the second position information is displayed on a map (S614).

For example, the processor 230 may update the first screen 710 such that the first, second and third position information P1A, P2A and P3A are displayed on the map. Accordingly, the fourth position information P4A, at which the fourth image information not including the first object O1A is photographed, may be excluded from the updated first screen 710.

Referring to FIGS. 1, 2, 6B, and 7, when the user interface 240 receives a user input for selecting the first object from the at least one object (S621), and the processor 230 extracts the second image information including the first object from the at least one image information captured by the camera 10 (S622), the processor 230 extracts time information corresponding to the second image information from at least one time information (S623).

For example, when the user interface 240 receives the fourth user input U4A for selecting the first object O1A, and the processor 230 extracts the first, second and third image information including the first object O1A, the processor 230 may extract, from the at least one time information, the first, second and third time information T1A, T2A and T3A corresponding to the first, second and third image information, respectively.

At this time, the processor 230 may update the fourth screen 740 such that the second and third objects O2a and O3a which are not selected are not displayed thereon in response to the fourth user input U4A for selecting the first object O1A.

Thereafter, the processor 230 updates the second screen 720 such that the second time information is displayed on a time bar (S624).

For example, the processor 230 may update the second screen 720 such that the first, second and third time information T1A, T2A and T3A are displayed on the time bar. Accordingly, the fourth time information T4A at which the fourth image information not including the first object O1A is photographed, may be excluded from the updated second screen 720.

That is, the image processing apparatus 200 may provide a user with the first object O1A selected by the user through the fourth screen 740, the map indicating the first, second and third position information P1A, P2A and P3A obtained by photographing the first object O1A through the first screen 710, the time bar representing the first, second and third time information T1A, T2A and T3A obtained by photographing the first object O1A through the second screen 720, and the first, second and third image information obtained by photographing the first object O1A through the third screen 730.

Figure 8:
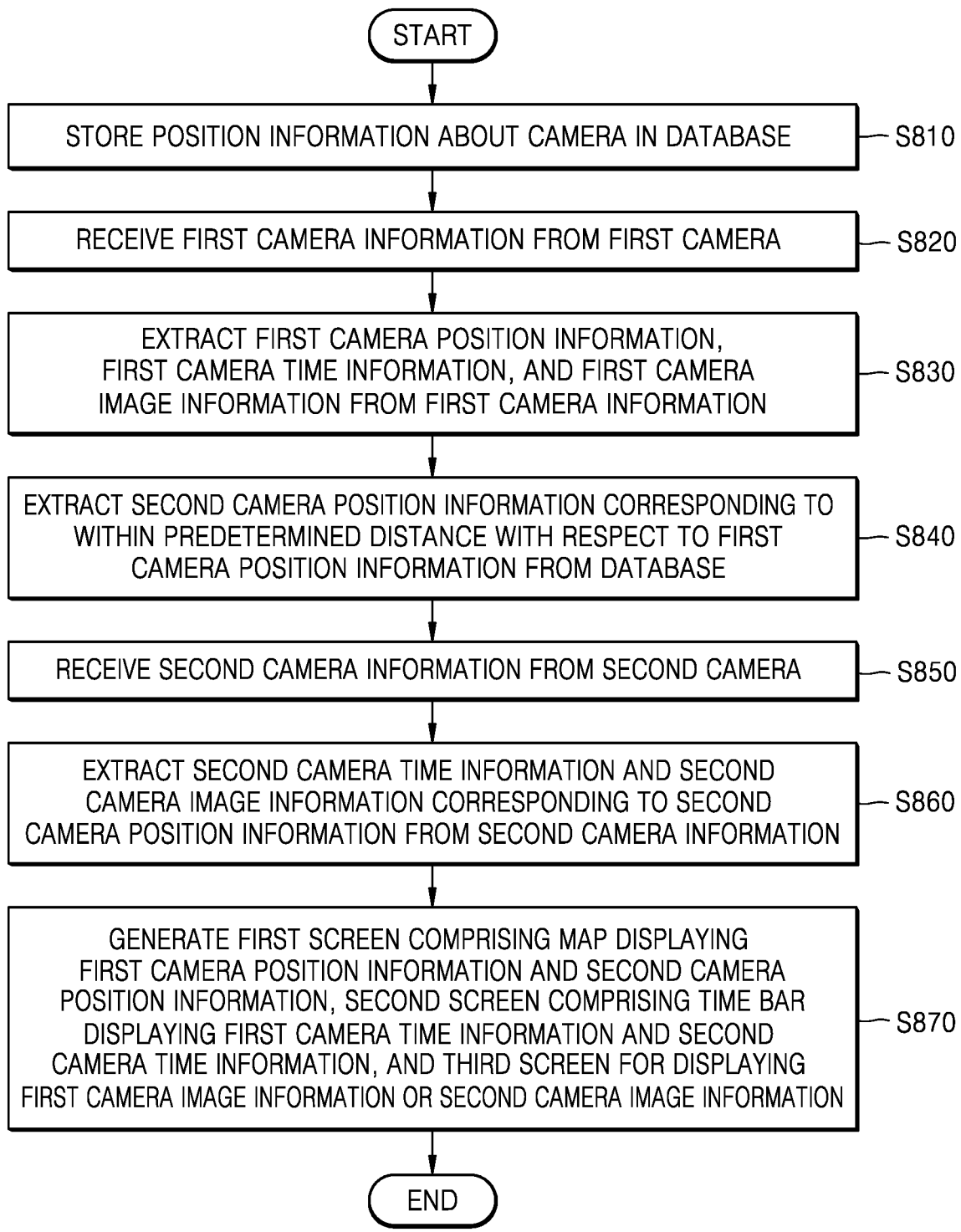
FIG. 8 is a flowchart illustrating an image processing method according to an embodiment.

FIG. 8 is a flowchart illustrating an image processing method according to an embodiment.

Figure 9:
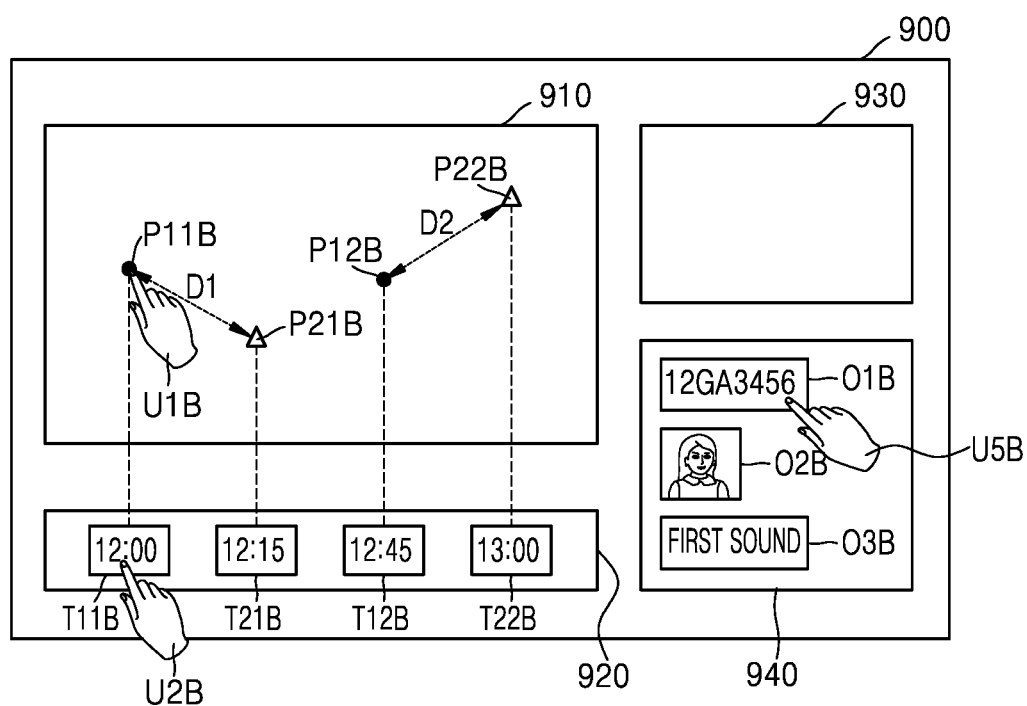
FIG. 9 is a diagram illustrating a screen of an image processing apparatus according to an embodiment.

FIG. 9 is a diagram illustrating a screen of an image processing apparatus, according to an embodiment.

Referring to FIGS. 1, 2, 8, and 9, the database 250 stores position information about the camera 10 (S810).

The camera 10 may be, for example, the stationary camera 12 installed in a building.

The database 250 may store, for example, first camera position information indicating a position of a first camera and second camera position information indicating a position of a second camera. The first camera and the second camera may be different cameras 10, and the first camera position information and the second camera position information may be different from each other.

The communication interface 220 receives first camera information from the first camera configured to recognize an object (S820).

The processor 230 extracts at least one first camera position information, at least one first camera time information, and at least one first camera image information corresponding to one another from the first camera information (S830). Here, the at least one first camera may be stationary or fixed cameras like the stationary camera 12.

The at least one first camera position information may be, for example, $11^{th}$ camera position information P11B and $12^{th}$ camera position information P12B. The at least one first camera time information may be, for example, $11^{th}$ camera time information T11B and $12^{th}$ camera time information T12B. The first camera image information may be, for example, $11^{th}$ camera image information and $12^{th}$ camera image information. Here, the $11^{th}$ and $12^{th}$ cameras may be stationary or fixed cameras.

At this time, the $11^{th}$ camera position information P11B, the $11^{th}$ camera time information T11B and the $11^{th}$ camera image information may correspond to one another, and the $12^{th}$ camera position information P12B, the $12^{th}$ camera time information T12B, and the $12^{th}$ camera image information may correspond to one another.

Then, the processor 230 extracts, from the database 250, at least one second camera position information indicating a position of the at least one second camera positioned within a predetermined distance from a position of the at least one first camera indicated by the at least one first camera position information (S840).

In other words, the processor 230 extracts, from position information stored in the database 250, information about a position of at least one second camera positioned within a predetermined distance from a position of the at least one first camera. Here, the at least one second camera may be stationary or fixed cameras like the stationary camera 12.

For example, the processor 230 may extract $21^{st}$ camera position information P21B positioned at a first distance D1 from the $11^{th}$ camera position information P11B and $22^{nd}$ camera position information P22B positioned at a second distance D2 from the $12^{th}$ camera position information P12B from the database 250. At this time, each of the first distance D1 and the second distance D2 may be smaller than a predetermined distance. Here, the $21^{st}$ and $22^{nd}$ cameras may be stationary or fixed cameras.

Hereinafter, a method of extracting at least one second camera position according to an embodiment will be described with reference to FIG. 10.

Figure 10:
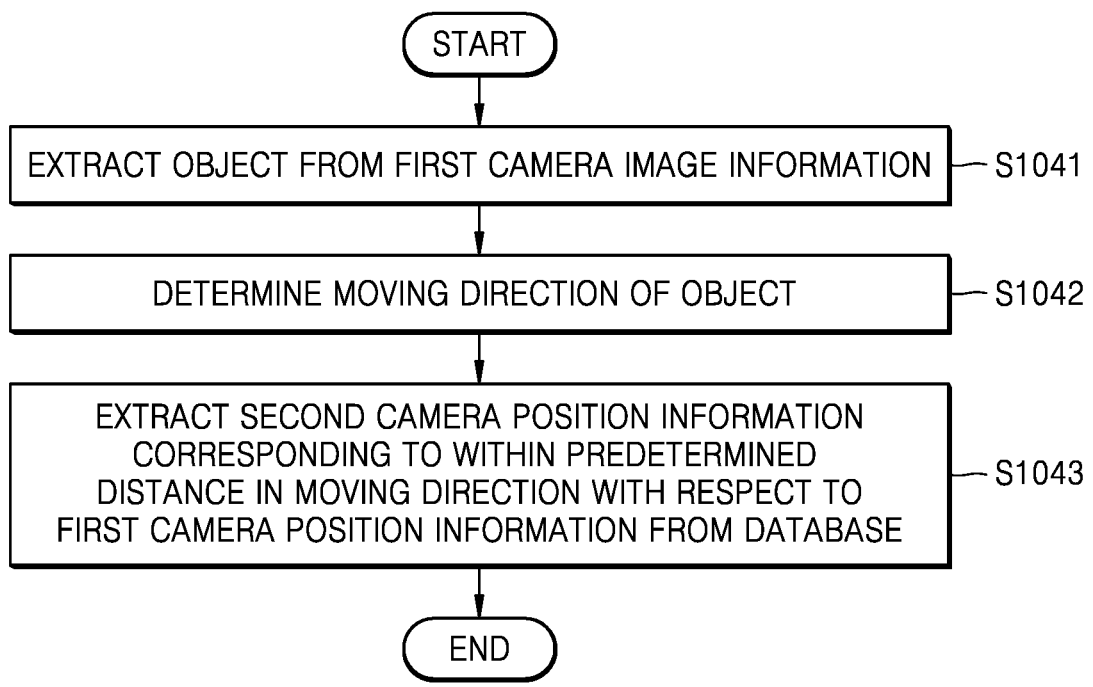
FIG. 10 is a flowchart illustrating an image processing method according to an embodiment.

FIG. 10 is a flowchart illustrating an image processing method according to an embodiment.

Referring to FIGS. 1, 2, 9, and 10, the processor 230 extracts an object from at least one first camera image information (S1041).

For example, the processor 230 may extract a predetermined license plate number of a vehicle from $11^{th}$ camera image information.

For example, the processor 230 may extract the predetermined license plate number of the vehicle from $12^{th}$ camera image information.

Then, the processor 230 determines a moving direction of the object (S1042).

For example, the processor 230 may determine a moving speed of a vehicle having the predetermined license plate number. That is, the processor 230 may determine a moving distance and the moving direction of the vehicle having the predetermined license plate number.

The moving direction of the vehicle having the predetermined license plate number obtained from the $11^{th}$ camera image information may be, for example, a southeast direction.

The moving direction of the vehicle having the predetermined license plate number obtained from the $12^{th}$ camera image information may be, for example, a northeast direction.

Then, the processor 230 extracts, from the database 250, second camera position information indicating a position of the at least one second camera positioned within a predetermined distance in the moving direction of the at least one object from a position of the first camera indicated by the first camera position information (S1043).

For example, the processor 230 may extract the $21^{st}$ camera position information P21B that is away from the $11^{th}$ camera position information P11B by the first distance D1 in the southeast direction.

For example, the processor 230 may extract the $22^{nd}$ camera position information P22B that is away from the $12^{th}$ camera position information P12B by the second distance D2 in the northeast direction.

Referring to FIGS. 1, 2, 8 and 9 again, the communication interface 220 receives the second camera information from a second camera that is not configured to recognize the object (S850).

The processor 230 extracts, from the second camera information, at least one second camera time information and at least one second camera image information corresponding to at least one second camera position information (S860).

The at least one second camera time information may be, for example, $21^{st}$ camera time information T21B and $22^{nd}$ camera time information T22B. The at least one first camera image information may be, for example, $21^{st}$ camera image information and $22^{nd}$ camera image information.

The processor 230 then generates a first screen 910 including a map displaying the at least one first camera position information and the at least one second camera position information, a second screen 920 including a time bar displaying the at least one first camera time information and at least one second camera time information, and a third screen 930 for displaying the at least one first camera image information or the at least one second camera image information (S870).

The at least one first camera position information and the at least one second camera position information are displayed to be distinguished from each other on the map.

For example, the processor 230 may display the $11^{th}$ camera position information P11B, the $12^{th}$ camera position information P12B, the $21^{st}$ camera position information P21B, and the $22^{nd}$ camera position information P22B on the map of the first screen 910. At this time, the $11^{th}$ camera position information P11B and the $12^{th}$ camera position information P12B may be displayed as circular shapes, and the $21^{st}$ camera position information P21B and the $22^{nd}$ camera position information P22B may be displayed as triangular shapes.

The at least one first camera time information and the at least one second camera time information are displayed to be distinguished from each other on the time bar.

For example, the processor 230 may display the $11^{th}$ camera time information T11B, the $12^{th}$ camera time information T12B, the $21^{st}$ camera time information T21B, the $22^{nd}$ camera time information T22B on the time bar of the second screen 920. At this time, the $11^{th}$ camera time information T11B and the $12^{th}$ camera time information T12B may be displayed in different colors from the $21^{st}$ camera time information T21B and the $22^{nd}$ camera time information T22B.

Figure 11:
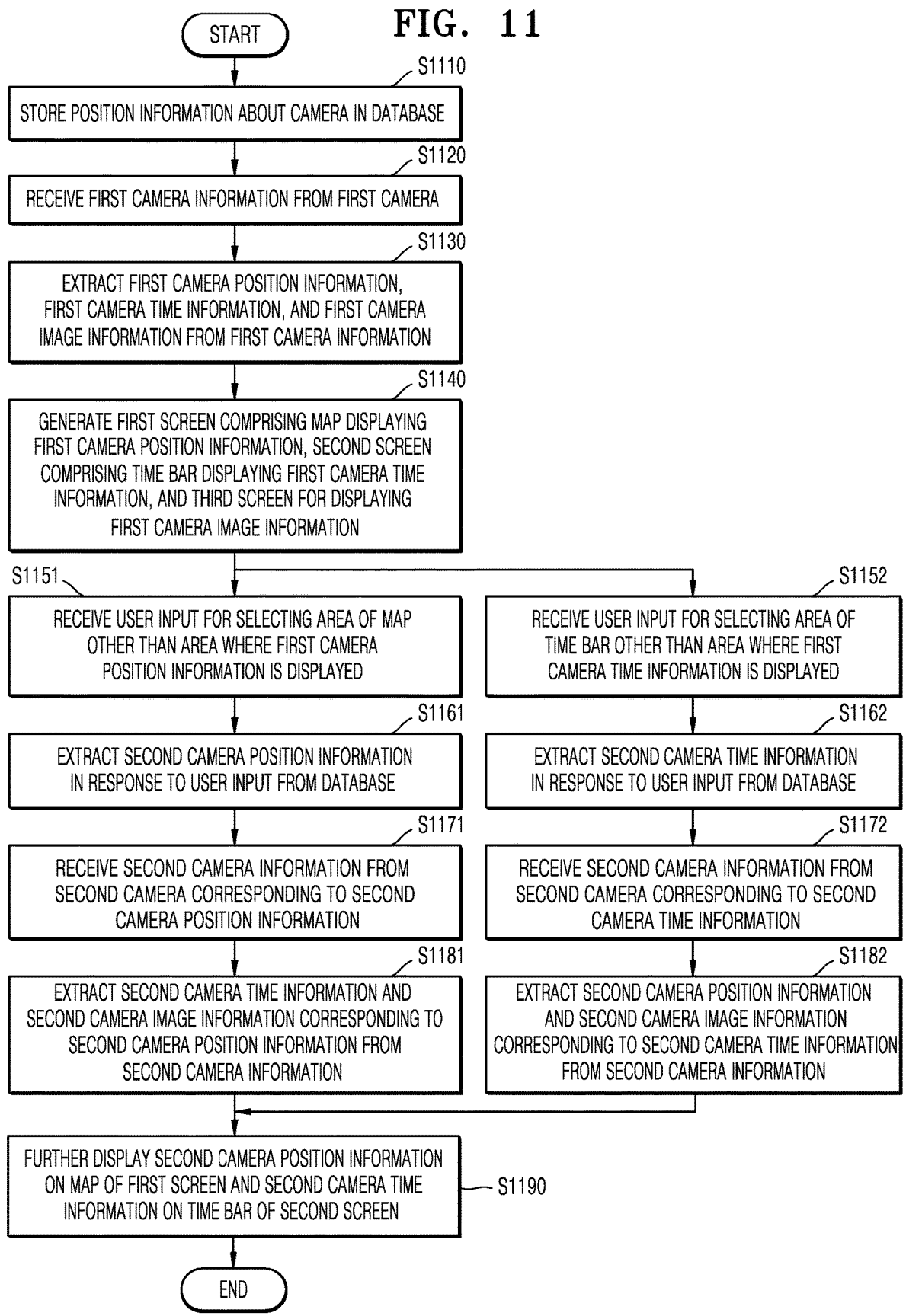
FIG. 11 is a flowchart illustrating an image processing method according to an embodiment.

FIG. 11 is a flowchart illustrating an image processing method according to an embodiment.

Figure 12:
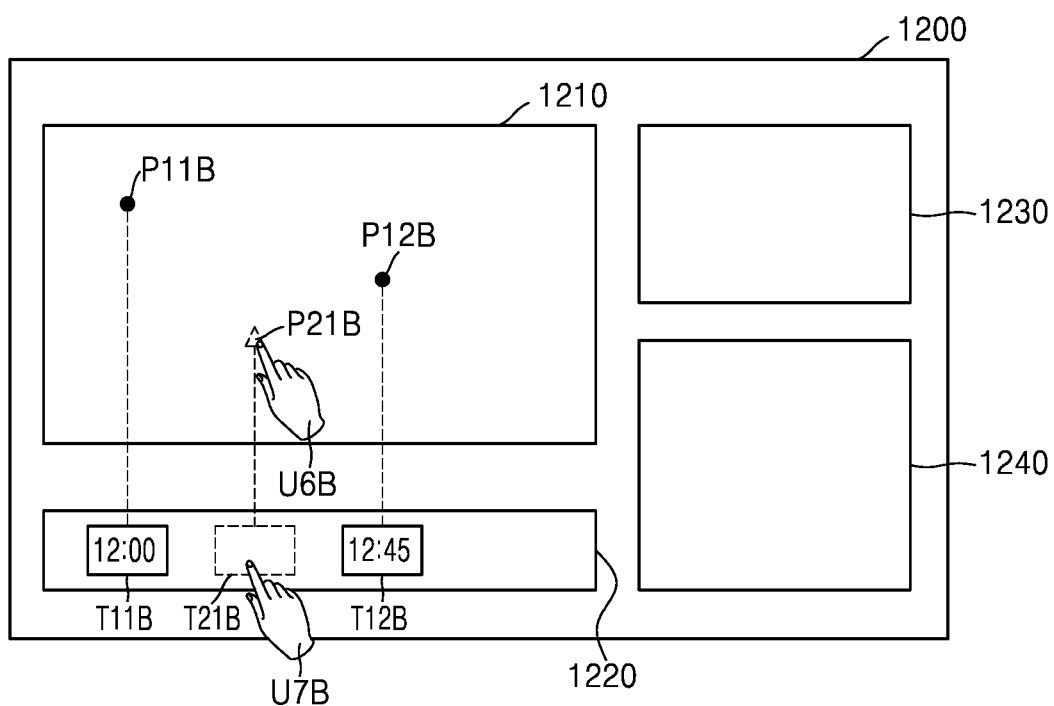
FIG. 12 is a diagram showing a screen of an image processing apparatus according to an embodiment.

FIG. 12 is a diagram showing a screen of an image processing apparatus according to an embodiment.

Referring to FIGS. 1, 2, 11, and 12, the database 250 stores position information about the camera 10 (S1110).

The communication interface 220 receives first camera information from a first camera configured to recognize the object (S1120).

The processor 230 extracts at least one first camera position information, at least one first camera time information, and at least one first camera image information corresponding to one another from the first camera information (S1130).

The at least one first camera position information may be, for example, the $11^{th}$ camera position information P11B and the $12^{th}$ camera position information P12B. The at least one first camera time information may be, for example, the $11^{th}$ camera time information T11B and the $12^{th}$ camera time information T12B. The at least one first camera image information may be, for example, the $11^{th}$ camera image information and the $12^{th}$ camera image information.

The $11^{th}$ camera position information P11b, the $11^{th}$ camera time information T11b, and the $11^{th}$ camera image information may correspond to one another. The $12^{th}$ camera position information P12b, $12^{th}$ camera time information T12b, and the $12^{th}$ camera image information may correspond to one another.

The processor 230 generates a first screen 1210 including a map displaying the at least one first camera position information, a second screen 1220 including a time bar displaying the at least one first camera time information, and a third screen 1230 for displaying the at least one first camera image information (S1140).

For example, the processor 230 may display the $11^{th}$ camera position information P11B and the $12^{th}$ camera position information P12B on the map of the first screen 1210 and the $11^{th}$ camera time information T11B and the $12^{th}$ camera time information T12B on the time bar of the second screen 1220.

Then, the user interface 240 receives a user input for selecting an area other than an area of the map where the first camera position information is displayed (S1151).

For example, the user interface 240 receives a sixth user input U6B for selecting an area between the eleventh camera position information P11B and the $12^{th}$ camera position information P12B of the first screen 1210.

The processor 230 extracts, from the database 250, the second camera position information corresponding to the user input (S1161).

For example, the processor 230 may extract from the database 250 the $21^{st}$ camera position information P21B corresponding to the sixth user input U6B.

The communication interface 220 receives the second camera information from a second camera corresponding to the second camera position information (S1171).

For example, the communication interface 220 may receive the second camera information from the second camera not configured to recognize the object corresponding to the $21^{st}$ camera position information P21B.

Then, the processor 230 extracts at least one second camera time information and at least one second camera image information corresponding to at least one second camera position information from the second camera information (S1181).

For example, the processor 230 may extract from the database 250 the $21^{st}$ camera time information T21B and the $21^{st}$ camera image information corresponding to the $21^{st}$ camera position information P21B from the second camera information.

Meanwhile, the user interface 240 receives a user input for selecting an area other than an area of the time bar where the first camera time information is displayed (S1152).

For example, the user interface 240 may receive a seventh user input U7B for selecting an area between the $11^{th}$ camera time information T11B and the $12^{th}$ camera time information T12B of the second screen 1220.

The processor 230 extracts, from the database 250, second camera time information corresponding to the user input (S1162).

For example, the processor 230 may extract, from the database 250, the $21^{st}$ camera time information T21B corresponding to the seventh user input U7B.

The communication interface 220 receives the second camera information from the second camera corresponding to the second camera time information (S1172).

For example, the communication interface 220 may receive the second camera information from the second camera not configured to recognize the object corresponding to the 21$^{st}$ camera time information T21B.

Then, the processor 230 extracts at least one second camera position information and at least one second camera image information corresponding to at least one second camera time information from the second camera information (S1182).

For example, the processor 230 may extract from the database 250 the 21$^{st}$ camera position information P21B and the 21$^{st}$ camera image information corresponding to the 21$^{st}$ camera time information T21B from the second camera information.

Then, the processor 230 further displays the second camera position information on the map of the first screen 1210 and the second camera time information on the time bar of the second screen 1220 (S1190).

For example, the processor 230 may display the 21$^{st}$ camera position information P21B on the map of the first screen 1210 and the 21$^{st}$ camera time information T21B on the time bar of the second screen 1220. At this time, the 21$^{st}$ camera position information P21B may be displayed to be distinguished from the 11$^{th}$ camera position information P11B and the 12$^{th}$ camera position information P12B, and the 21$^{st}$ camera time information T21B may be displayed to be distinguished from the 11$^{th}$ camera time information T11B and the 12$^{th}$ camera time information T12B.

Figure 13:
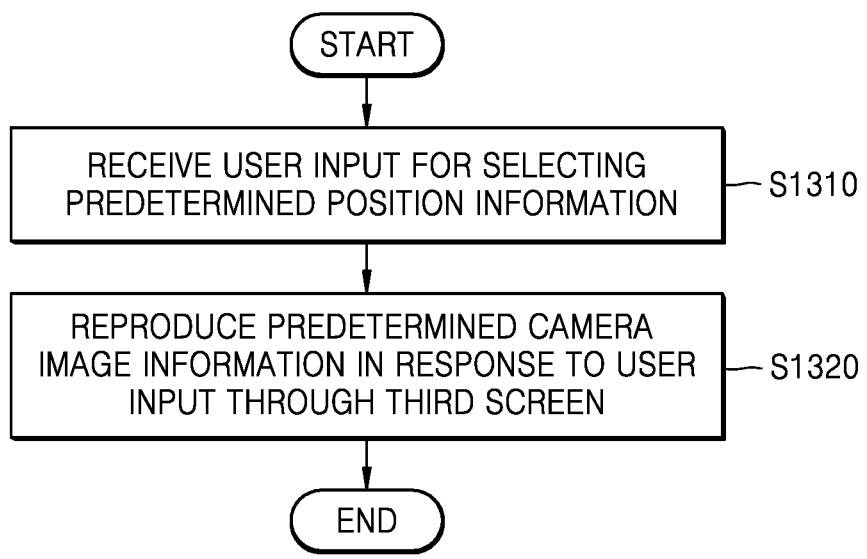
FIG. 13 is a flowchart illustrating an image processing method according to an embodiment.

FIG. 13 is a flowchart illustrating an image processing method according to an embodiment.

Referring to FIGS. 1, 2, 9, and 13, when the user interface 240 receives a user input for selecting predetermined position information (S1310), the processor 230 reproduces predetermined camera image information through the third screen 930 in response to the user input (S1320).

For example, when the user interface 240 receives the first user input U1B for selecting the 11$^{th}$ camera position information P11B displayed on a map of the first screen 910, the processor 230 may reproduce first camera image information through the third screen 930 in response to the first user input U1B.

For example, when the user interface 240 receives the second user input U2B for selecting the 11$^{th}$ camera time information T11B displayed on a time bar of the second screen 920, the processor 230 may reproduce the first camera image information through the third screen 930 corresponding to the second user input U2B.

According to the embodiments of the present disclosure, it is possible to display a map representing a position where an object is photographed, a time bar representing a time at which the object is photographed, and an image of the photographed object on different screens simultaneously. However, as the inventive concept is not limited to the above embodiments, the screens respectively displaying the map and the time bar may be implemented in many different forms to display position information an time information without using the map and the time bar.

Therefore, security may be further strengthened, and a security system according to user convenience may be provided.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An image processing apparatus comprising:
    a display configured to display a plurality screens;
    a communication interface configured to receive camera information from at least one camera;
    a memory;
    a processor configured to:
        extract at least one position information, at least one time information, and at least one image information corresponding to one another from the camera information; and
        generate a first screen displaying the at least one position information, a second screen displaying the at least one time information, and a third screen for displaying the at least one image information; and
    a user interface configured to receive a user input for selecting at least one of first position information from the at least one position information and first time information from the at least one time information,
    wherein the processor is further configured to extract, from the at least one image information, first image information corresponding to at least one of the first position information and the first time information, and reproduce the first image information through the third screen,
    wherein the processor is further configured to extract at least one object from the at least one image information, and generate a fourth screen displaying the at least one object,
    wherein the user interface is further configured to receive a user input for selecting a first object from the at least one object,
    wherein the processor is further configured to extract second image information comprising the first object from the at least one image information and reproduce the second image information through the third screen, and
    wherein the processor is further configured to extract second position information corresponding to the second image information from the at least one position information, extract second time information corresponding to the second image information from the at least one time information, update the first screen such that the second position information is displayed thereon, and update the second screen such that the second time information is displayed thereon.

2. The image processing apparatus of claim 1, wherein the at least one position information is displayed in a form of a map.

3. The image processing apparatus of claim 1, wherein the at least one camera is a movable camera.

4. The image processing apparatus of claim 1, wherein the processor is further configured to update the first screen such that a position corresponding to only the second position information is distinguishably displayed thereon among the at least one position information, and update the second screen such that a time point corresponding to only the second time information is distinguishably displayed thereon among the at least one time information.

5. The image processing apparatus of claim 1, further comprising a database storing camera position information, the database being stored in the memory,
wherein the camera information received from the at least one camera comprises first camera information received from a first camera configured to recognize an object, and second camera information received from a second camera not configured to recognize the object, and
wherein the processor is further configured to:
extract, from the first camera information, at least one first camera position information, at least one first camera time information, and at least one first camera image information corresponding to one another;
extract, from the database, at least one second camera position information indicating a position of the at least one second camera positioned within a predetermined distance from a position of the at least one first camera indicated by the at least one first camera position information;
extract, from the second camera information, at least one second camera time information and at least one second camera image information corresponding to the at least one second camera position information;
display, on the first screen, the at least one first camera position information and the at least one second camera position information;
display, on the second screen, the at least one first camera time information and the at least one second camera time information; and
display, on the third screen, the at least one first camera image information or the at least one second camera image information.

6. The image processing apparatus of claim 5, wherein the at least one first camera and the at least one second camera are stationary cameras.

7. The image processing apparatus of claim 5, wherein the at least one first camera position information and the at least one second camera position information are displayed distinguishably from each other on the first screen, and
wherein the at least one first camera time information and the at least one second camera time information are displayed distinguishably from each other on the second screen.

8. The image processing apparatus of claim 5, wherein the processor is further configured to:
extract the object from the at least one first camera image information;
determine a moving direction of the object; and
extract, from the database, the at least one second camera position information indicating a position of the at least one second camera positioned within the predetermined distance in the moving direction of the object from a position of the at least one first camera indicated by the at least one first camera position information.

9. An image processing apparatus comprising:
a memory storing a database storing camera position information;
a display configured to display at least one screen;
a communication interface configured to receive first camera information from at least one first camera configured to recognize an object, and receive second camera information from at least one second camera not configured to recognize the object; and
a processor configured to:
extract, from the first camera information, at least one first camera position information, at least one first camera time information, and at least one first camera image information corresponding to one another;
extract, from the database, at least one second camera position information indicating a position of the at least one second camera positioned within a predetermined distance from a position of the at least one first camera indicated by the at least one first camera position information;
extract, from the second camera information, at least one second camera time information and at least one second camera image information corresponding to the at least one second camera position information; and
generate a first screen displaying the at least one first camera position information and the at least one second camera position information, a second screen displaying the at least one first camera time information and the at least one second camera time information, and a third screen for displaying the at least one first camera image information or the at least one second camera image information,
wherein the at least one first camera position information and the at least one second camera position information are displayed distinguishably from each other on the first screen or the second screen.

10. The image processing apparatus of claim 9, wherein the object is at least one of a license plate number of a vehicle, a face, a voice, and a sound having a predetermined frequency.

11. The image processing apparatus of claim 9, wherein the at least one first camera and the at least one second camera are stationary cameras.

12. The image processing apparatus of claim 9, wherein the processor is further configured to:
extract the object from the at least one first camera image information;
determine a moving direction of the object;
and extract, from the database, the at least one second camera position information indicating a position of the at least one second camera positioned within the predetermined distance in the moving direction of the object from a position of the at least one first camera indicated by the at least one first camera position information.

13. The image processing apparatus of claim 9, further comprising a user interface configured to receive a user input for selecting an area other than an area of the at least one first camera position information on the first screen,
wherein the processor is further configured to extract, from the database, the at least one second camera position information corresponding to the selected area, in response to the user input.

14. The image processing apparatus of claim 9, further comprising a user interface configured to receive a user input for selecting an area other than an area of the at least one first camera time information on the second screen,
wherein the processor is further configured to extract, from the database, the at least one second camera position information corresponding to the selected area, in response to the user input.

15. The image processing apparatus of claim 9, further comprising a user interface configured to receive a first user input for selecting the at least one first camera position information or the at least one second camera position information displayed on the first screen, and a second user input for selecting the at least one first camera time information or the at least one second camera time information displayed on the second screen, wherein the processor is further configured to reproduce the at least one first camera image information or the at least one second camera image information through the third screen in response to the first user input, and reproduce the at least one first camera image information or the at least one second camera image information through the third screen in response to the second user input.

16. An image processing method comprising:

storing camera position information in a database stored in a memory;

receiving first camera information from at least one first camera capable of recognizing an object, and receiving second camera information from at least one second camera not configured to recognize the object, by using a communication interface;

extracting, from the first camera information, at least one first camera position information, at least one first camera time information, and at least one first camera image information corresponding to one another, by using a processor;

extracting, from the database, at least one second camera position information indicating a position of the at least one second camera positioned within a predetermined distance from a position of the at least one first camera position indicated by the at least one first camera position information, by using the processor;

extracting, from the second camera information, at least one second camera time information and at least one second camera image information corresponding to the at least one second camera position information, by using the processor; and generating a first screen displaying position information comprising the at least one first camera position information, a second screen displaying time information comprising the at least one first camera time information, and a third screen for displaying the at least one first camera image information, by using the processor, wherein the at least one first camera position information and the at least one second camera position information are displayed distinguishably from each other on the first screen or the second screen.

17. The image processing apparatus of claim 1, wherein the at least one object comprises at least one of a license plate number of a vehicle, a face, a voice, a sound having a predetermined frequency.

18. The image processing apparatus of claim 1, wherein the camera information is transmitted to a monitoring terminal over a network.

* * * * *